United States Patent [19]

Ducati

[11] Patent Number: 4,460,442
[45] Date of Patent: Jul. 17, 1984

[54] HYDROMETALLURGICAL METHOD FOR RECOVERING METAL MATERIALS FROM SPENT LEAD-ACID STORAGE BATTERIES

[75] Inventor: Umberto Ducati, Milan, Italy

[73] Assignee: Hydrometal S.p.A., Italy

[21] Appl. No.: 408,540

[22] Filed: Aug. 16, 1982

[30] Foreign Application Priority Data

Sep. 2, 1981 [IT] Italy ............................ 23745 A/81

[51] Int. Cl.³ .............................................. C25C 1/18
[52] U.S. Cl. ..................................... 204/114; 423/92; 423/98; 75/101 R; 75/108; 75/120
[58] Field of Search .............. 75/120, 101 R, 77, 108; 204/116, 115, 114, 88, 96; 423/92, 98

[56] References Cited

U.S. PATENT DOCUMENTS

| | | | |
|---|---|---|---|
| 1,752,356 | 4/1930 | Smith | 204/116 |
| 2,328,089 | 8/1943 | Mulligan | 75/120 |
| 3,743,501 | 8/1971 | Cusanelli | 423/98 |
| 3,892,563 | 7/1975 | LaPoint | 423/98 |
| 4,107,007 | 8/1978 | Gaumann et al. | 204/114 |
| 4,229,271 | 10/1980 | Prengaman et al. | 204/114 |

Primary Examiner—John Doll
Assistant Examiner—Robert L. Stoll
Attorney, Agent, or Firm—Kenway & Jenney

[57] ABSTRACT

In the method the ground scraps are screened to separate the pole active material, i.e. Pb and $PbO_2$, as fines. This active material is then reacted in the presence of a strong alkaline solution to yield a minium precipitate.

Minium may be subsequently treated with an appropriate acid, such as fluoboric acid, freed of antimony by precipitating the latter with metal lead, and then subjected to electrolysis to recover lead.

14 Claims, 1 Drawing Figure

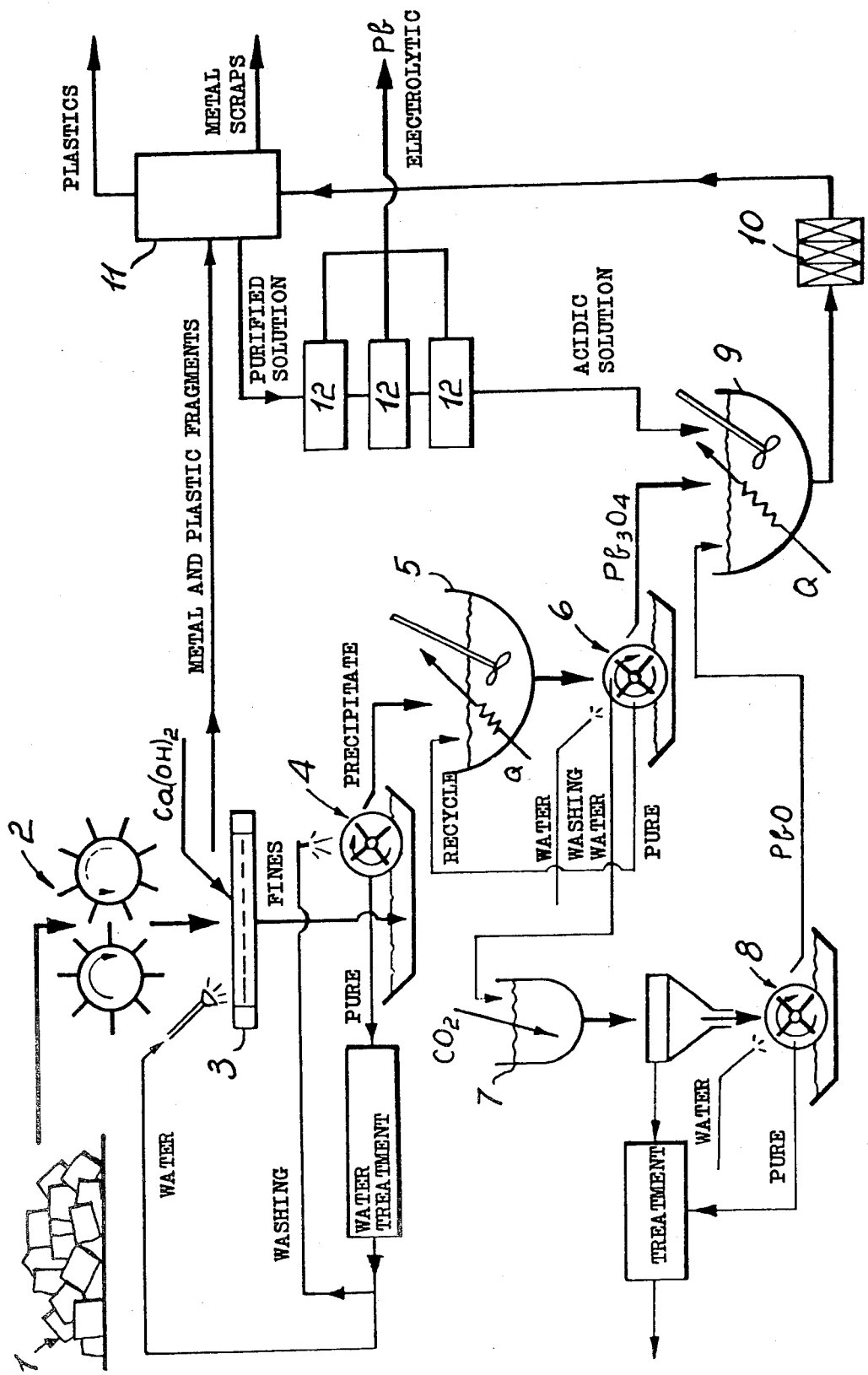

HYDROMETALLURGICAL METHOD FOR RECOVERING METAL MATERIALS FROM SPENT LEAD-ACID STORAGE BATTERIES

BACKGROUND OF THE INVENTION

This invention relates to a novel hydrometallurgical method for recovering lead in the oxide or metal forms from spent lead-acid storage batteries.

As is known, the recovery and re-use of the materials contained in lead-acid storage batteries (i.e. for a major part, vehicle-mounted electric starting batteries) is one of the crucial knots of non-ferrous metallurgy.

In fact, such recovery is a necessity, since it covers a more than significant proportion of the total availability of lead, it being evaluated to about 2 kg/vehicle per annum (that is, for Italy alone, short of 20,000 metric tons/year). At the present state of the art and of technology, only the pyrometallurgical recovery method is of actual industrial interest.

However, the difficulties involved in the correct operation of lead-producing pyrometallurgical plants are practically unsurmountable from the health and environment protection standpoint already at current tolerated rates of emission.

This situation would be expected to rapidly deteriorate as the amount of maintenance-free batteries containing Pb-Ca alloys increases in the stocks of scrapped batteries. The presence of calcium, in fact, is bound to result, in the reduction furnaces, in the formation of hydrogen from the cracking of water contained as moisture in the atmosphere of furnaces and in the charge. In the existing conditions, the hydrogen released from metallurgical processes will react with the antimony and arsenic present in traditional storage batteries as alloying elements to yield volatile arsine and stibine, the polluting potentials whereof are well known.

Since the above adds to other pressing and costly problems already posed (such as the formation of $SO_2$, volatile compounds and vapors containing Pb, the emission of the combustion products of organic materials and resins), it is not too far-fetched to anticipate within the span of a few years the barring of pyrometallurgical lead recovery processes from scrapped batteries in the most involved countries in the ecological issue.

Actually, already since some years there have been conducted studies on innovative and non-polluting processes for the recovery of lead from spent lead-acid batteries; but none of such processes has gained commercial acceptance (it will be sufficient to mention here the Ginatta process of direct electrochemical extraction or a process of attack of battery scraps with alkaline carbonates).

The abundant formation of slurries, labor cost, time requirements, and the consumption of reactants have been hindering on occasions an extensive application of such prior processes.

SUMMARY OF THE INVENTION

It is a primary object of this invention to provide a method for recovering metals from spent storage batteries, which can represent a satisfactory alternative to the pyrometallurgical process currently practiced, while obviating its drawbacks as mentioned above.

Another object of the invention is to provide a method for recovering lead, as such or as a valuable derivative, which affords the maximum recovery efficiency in a simple manner through the use of readily available and inexpensive means.

A further object of this invention is to provide a lead recovery method from spent lead-acid batteries, which is non-polluting and accordingly preferred for health and environment protection reasons.

Yet another object of the invention is to provide a method as indicated, which enables the overall recovery, in addition to metal materials, of all the materials contained in storage batteries, to yield no waste or unusable by-products.

These and other objects, such as will be apparent hereinafter, are achieved by a hydrometallurgical method for recovering metalliferous materials from spent lead-acid storage batteries, characterized in that it comprises the steps of separating from storage battery scraps the pole active material including mainly lead and lead dioxide in a finely divided form, mixing said active material with a strong alkaline solution selected from solutions of sodium hydroxide and potassium hydroxide in concentrations ranging from 50 to 300 g/l, the ratio of said active materials to said alkaline solution being in the 1:1 to 1:100 range, reacting said mixture at a temperature in the 100°-120° C. range, and separating from said reaction mixture minium ($Pb_3O_4$) as a product precipitate and said alkaline solution.

According to another aspect thereof, this invention provides a hydrometallurgical method for recovering metal materials from spent lead-acid storage batteries, characterized in that it comprises the steps of separating from storage battery scraps the pole active material mainly containing lead and lead dioxide in a finely divided form, mixing said active material with a strong alkaline solution selected from solutions of sodium hydroxide and potassium hydroxide in concentrations ranging from 50 to 300 g/l, the ratio of said active material to said alkaline solution being in the 1:1 to 1:100 range, reacting said mixture at a temperature in the 100°-120° C. range, separating from the resulting reaction mixture minium as a product precipitate, subjecting the separated minium to attack by an acid selected from fluoboric acid, fluosilicic, acid, sulphamic acid, in concentrations ranging from 1 to 5 moles/l, separating the resulting solution from solid residues, and subjecting said solution to electrolysis to obtain lead as final product.

BRIEF DESCRIPTION OF THE DRAWING

The method of this invention is based upon a chemical reaction which is not yet fully described in the technical and scientific literature, and which may probably be summarized by the following equation,

Thus, the method according to this invention leads to the quantitative recovery of the lead contained in the active material of storage batteries. This was not possible, for example, with attempts to directly extract Pb electrochemically because lead dioxide is insoluble in the mineral acids used for electrochemical extraction.

Lead dioxide, however, can react rapidly in the presence of hot concentrated alkali (which presumably effect the transport of lead ions in solution) with lead to yield minium ($Pb_3O_4$). This is a product of considerable commercial value which may be sold directly or dissolved in a suitable acidic solution (such as fluoboric acid), wherefrom it is easy to obtain lead metal by an electrochemical process.

DESCRIPTION OF THE PREFERRED EMBODIMENTS

Further features and advantages of the invention will be apparent from the following detailed description of preferred but not limitative embodiments of this method, with reference to the accompanying drawing showing a flow diagram thereof.

(1) Grinding and preliminary separation

Battery scraps 1, which are usually freed of acid, are coarsely ground in a peg or jaw crusher 2. This yields a mix containing ebonite, polyethylene, impregnated and porous material from the separators, lead metal forming the rheophore bridges and posts, lead metal from the grids and the anodic and cathodic pastes comprising $PbO_2$ and Pb which cover the grids and form the active material in storage batteries. All this material is wet owing to residual diluted sulphuric acid still present, and contains small amounts of $PbSO_4$.

It is fairly easy to separate the compact material (plastics and metal) of large size from the slurry (pastes and small fragments of other materials), e.g. in a vibratory sieve 3 in wet conditions, wherein the residual sulphuric acid may be neutralized, for example, with diluted Ca(OH)$_2$ or NaOH.

The coarse portion, which contains a major portion of the plastic materials and metal material, both crushed to pieces, will be subsequently subjected to gravimetric classifying as described hereinafter.

(2) Electrode paste leaching

The portion of fines from the preceding step, which contains the active material as a slurry and a few fragments of plastics, following scouring and filtering on a continuous filter 4 is delivered to a leacher wherein it is reacted in the presence of strong bases.

In the leacher 5, the slurry is mixed with a strongly alkaline solution e.g. a 200-300 g/l NaOH solution. A ratio of active matter to base of 1:1 to 1:100, preferably 1:3 to 1:5 is used. The reaction mixture is heated to a temperature close to boiling, such as 100°-120° C., and kept in a stirred state.

Within a short time, the brownish mass of slurry will take a dark orange-red color. Upon completion of the reaction, which may last for about thirty minutes all told, the alkaline solution is separated from the minium precipitate, as formed for example by means of a vacuum filter 6.

It has been experimentally found that the slurry treated on the vibratory sieve has a suitable composition for practically complete conversion into minium in the basic leacher 5.

Should particular operating conditions yield a slurry less rich in metal lead, or in lead dioxide, where the stoichiometric conditions for complete conversion of the slurry into red lead are not met, it will be possible, through suitable additivation, to correct the composition of the starting mixture.

The alkaline solution recovered at the filter 6 is advantageously recycled for attacking a fresh mass of slurry in the leacher 5; the minium precipitate is washed with water, which will remove the residual alkaline solution imbibed in the filtrate. Since that solution is strongly basic, it will contain a certain amount of lead in solution as plumbite and plumbate ion.

From the washing water there may be recovered, if desired, lead as basic carbonate, e.g. by scrubbing with $CO_2$ gas as indicated at 7, which will cause it to precipitate quantitatively; the oxide or carbonate precipitate is separated on a vacuum filter 8. If the performance capabilities of the vacuum filter 6 are at least normal, this treatment of the washing water is more of environmental than technological interest; it is in all cases highly efficient.

The precipitate collected from the vacuum filter 6 comprises commercial purity minium. It may be used as such in dye work.

According to a further embodiment of the invention, the minium is subsequently treated for the recovery of lead metal, as explained hereinafter. In the leacher 5, the slurry is purified of a large portion of the plastic material which, by floating over the denser solution, can be easily removed.

(3) Acid attack

In another embodiment of the method according to this invention, where it is desired to recover the lead as metal, the minium—converted slurry, as purified of most of the plastic material and washed, it subjected to attack with a suitable acidic solution selected from fluoboric, fluosilicic or sulphamic acid, e.g. with fluoboric acid in an acidic leacher 9 wherethrough any basic carbonate recovered at 8 is conveyed. It is advisable to also conduct this step at a higher than ambient temperature, illustratively of 30°-80° C., e.g. of about 60° C.

By operating in this way, the reddish mass of minium is rapidly dissolved, e.g. as Pb fluoborate, to leave at the bottom but a few slurry impurities and allow all the residual plastics fragments to float. In fact, the resulting lead fluoborate solution has a sufficient density to also separate the ebonite fragments.

After the separation of the plastic material, the solution is filtered in a filter 10 for removing the slurries which represent normally an amount equal to or lesser than 2% of the initial weight of slurry.

The Pb fluoborate solution, which contains about 200 g/l Pb, is impure owing to antimony and, in the course of the subsequent electrolytic deposition, this could result in the obtainment of impure lead.

(4) Purification of the solution

Next, the antimony present in the solution obtained during the preceding step is separated by a reaction with lead metal called also "cementation", in a cementation reactor 11. The exchange reaction

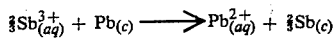

is greatly favored.

It is convenient, for this purpose, to use for Pb scraps from bridges, poles and grids separated on the vibratory sieve 3 during the step described hereinabove.

This affords, in fact, the dual effect of separating the antimony present in the solution by means of said cementation reaction, and of purifying the metal scraps of any foreign matter contained therein, in particular of all the plastic material from the crushing of the battery cases.

Thus, from the above operation, the following three material flows are obtained:
 a. plastics material in fragments;
 b. purified lead fluoborate solution at a pH of about 1;

c. foreign matter-free metal scraps which separate by gravimetric classifying.

The stream a, dripped of the solution which may be recycled, and possibly together with the plastics separated in the basic leacher 5, may be washed, dried, and ground for utilization as a plastic granulate for molding. The stream b is subjected, at a later stage, to electrolysis for the extraction of electrolytic Pb.

The stream c, dripped, washed and dried, may be re-melted, e.g. in an electric furnace, to produce pigs of a Pb-Sb alloy ready for commercial delivery or to be subjected to electrolytic refining. Being free of foreign matter, such scraps melt at a low temperature without releasing harmful emissions.

(5) Electrolytic extraction of Pb

The lead fluoborate solution (stream b), as purified during the preceding step, is fed to electrolytic extraction, in standard electrolysis cells 12, with anodes of graphite or other material.

The experience made suggests anyhow the use of graphite anodes, on which the anodic process of discharge of oxygen gas takes place with great effectiveness, with virtual absenc of competing processes such as the deposition of lead dioxide or the formation of $CO_2$.

The lead thus obtained can be delivered for sale and the fluoboric solution, no longer containing lead and consequently once again acidic, may be recycled to attack fresh minium in the acidic leacher 9.

The method according to this invention will now be better understood with reference to the examples given hereinbelow, which are just illustrative of some particular embodiments of the invention.

EXAMPLE 1

Fresh reagents
Base: 1 kg paste. NaOH solution concentration=200 g/l
Paste/NaOH solution ratio=⅓ by weight
Temperature of the reaction=104° C. (boiling)
Duration of the reaction=30 minutes
After filtration and washing an undissolved residue is obtained: 516 g (on dry basis).

This residue is subjected to attack by a 30% acqueous solution of fluoboric acid, at 60° C. for 30 minutes. 208 g of a residue result, of which 112 g consist of lead metal, the remaining consisting of residue of plastics material (36 g) and of electrode pastes in particulate form >2 mm.

By grinding the residue and repeating on the amount of 208 g the attack with basic substance, still as fresh reagents, 160 g of washed precipitate are obtained; after an attack by fresh fluoboric acid, of the same concentration, 72 g insoluble residue result of which 48 g are lead metal.

EXAMPLE 2

Recycle reagents
These reagents are prepared as follows:
(a) basic solution for attack of the crude paste: Starting from a NaOH solution with a concentration of 200 g/l repeated attacks of the crude paste are carried out, under the conditions mentioned above care being taken to collect each time the filtrate (strong alkaline solution of NaOH) and the water used for the washing of the precipitate and to bring each time the solution to its initial volume by boiling and evaporating the excesss water. A typical analysis of such a recycle solution is the following:

| | |
|---|---|
| Pb (as ion) | 0.7 moles/l |
| NaOH (free) | 3.2 moles/l |
| Sb (as ion) | 0.025 moles/l |
| As (as ion) | <0.001 moles/l |

If the solution is aged enough such concentrations are stabilized due to the ion exchanges with the precipitates.

By carrying out the attack of the crude paste with such solution, under conditions identical to those in Example 1, the following results are obtained:
Base: 1 kg crude paste+3 liters (about) of solution
Residue: 0.820(±10%) kg of precipitate and about 2 l of washing solution with a concentration of about 50 g/l of Pb (as ion).

This precipitate, washed before, is subjected to attack at 60° C. for 30 minutes by an 8 l acid solution of fluoboric acid of the following composition:

| | |
|---|---|
| Pb (as ion) | 0.5 moles/l |
| $HBF_4$ (free form) | 1.2 moles/l |
| Sb (as ion) | 0.01 moles/l |
| As (as ion) | traces |
| Na (as ion) | traces |

An undissolved residue is obtained in an amount of about 220 g which has a composition analogous to that in the preceding example, and which can be subjected to an identical further treatment (grinding, new attack with basic solution, new attack with fluoboric acid). After re-treating the residue about 80 g of precipitate result having the following average composition:
Lead metal . . . 50%
Insoluble salts ($PbSO_4$, etc.) . . . 20%
Plastics material and inert materials . . . the remaining

EXAMPLE 3

The lead fluoborate solution obtained as indicated in the generic disclosure of the invention is subjected to electrolysis under the following conditions:

| | |
|---|---|
| temperature | 38–40° C. |
| current density | 300 A/m$^2$ |
| (initial voltage) | (2.1 V) |
| [$Pb^{2+}$] | ~200 g/l |
| animal glue | 0.3% |
| anode | graphite |

A compact deposit of lead is obtained having the following composition:

| | |
|---|---|
| Pb | 99.987% |
| Sb | 0.004 |
| As | traces |
| Fe | traces |

It will be appreciated from the foregoing description that the invention achieves its objects. In fact the hydrometallurgical method of this invention allows recovery of the lead from spent batteries in a substantially quantitative fashion, with a low consumption of inexpensive materials and through commonly available means. It is a process which does not release polluting byproducts, thereby it has no problems of a health or environment protection nature, and appears to be in perspective a satisfactory alternative method, especially in those countries where strict environment protection standards are maintained.

While the invention has been described with reference to preferred embodiments thereof, it is intended that modifications and variations may be readily introduced without departing from the invention scope.

I claim:

1. A hydrometallurgical method for recovering metalliferous materials from spent lead-acid storage batteries, characterized in that it comprises the steps of separating from storage battery scraps the pole active material including mainly lead and lead dioxide in a finely divided form, mixing said active material with a strong alkaline solution selected from solutions of sodium hydroxide and potassium hydroxide in concentrations ranging from 50 to 300 g/l, the ratio of said active material to said alkaline solution being in the 1:1 to 1:100 range, heating said mixture at a temperature in the 100°–120° C. range, so as to react said lead with said lead dioxide to obtain minium ($Pb_3O_4$) and separating from said reaction mixture the minium as a product precipitate.

2. A method according to claim 1, wherein said alkaline solution is a hot sodium hydroxide solution in the concentration range of 200 to 300 g/l.

3. A method according to claim 1, wherein said separation of the active material of the poles is effected by coarsely crushing storage battery scraps, and subjecting said scraps to screening to recover said active material as fines and coarse material fragments comprising lead metal and plastics material.

4. A method according to claim 1, wherein said step of separating the product from the reaction mixture is effected by filtering and washing with water the resulting minium to remove residues of said alkaline solution, the washing water being then subjected to scrubbing with $CO_2$ to recover any removed lead.

5. A method according to claim 1, wherein the alkaline solution obtained during the product separation step is recycled to said mixing step with a fresh charge of said active material.

6. A method according to claim 1, further comprising the treatment of the minium product to recover lead metal therefrom, including the steps of subjecting the minium to attack by an acid selected from fluoboric acid, fluosilicic acid and sulphamic acid in concentrations of 1–5 moles/liter, separating the resulting solution from solid residues, and subjecting said resulting solution to electrolysis to separate lead and recover said acid.

7. A method according to claim 6, wherein said acid is fluoboric acid.

8. A method according to claim 6, wherein the reaction with said acid is carried out at 30°–80° C.

9. A method according to claim 6, wherein prior to said electrolysis step the lead solution is purified of antimony by reacting it with lead metal.

10. A method according to claim 9, wherein as lead metal, the lead obtained from said step of separating the active material from ground battery scraps is used.

11. A method according to claim 6, wherein the acid separated during said electrolysis step is recycled to said step of acid attack of minium.

12. The method of claim 1 further comprising adjusting the composition of said active material to a lead to lead dioxide ratio substantially equal to 1:2.

13. A hydrometallurgical method for recovering metalliferous materials from spent lead-acid storage batteries, characterized in that it comprises the steps of separating from storage battery scraps the pole active material mainly containing lead and lead dioxide in a finely divided form, mixing said active material with a strong alkaline solution selected from solutions of sodium hydroxide and potassium hydroxide in concentrations ranging from 50 to 300 g/l, the ratio of said active material to said alkaline solution being in the 1:1 to 1:100 range, heating said mixture at a temperature in the 100°–120° C. range, so as to react the lead with the lead dioxide to obtain minimum ($Pb_3O_4$) separating from the resulting reaction mixture the minium as a product precipitate, subjecting the separated minium to attack by an acid selected from fluoboric acid, fluosilicic acid and sulphamic acid, separating the resulting solution from the solid residue, and subjecting said solution to electrolysis to obtain lead as final product.

14. The method of claim 13 further comprising adjusting the composition of said active material to a lead to lead dioxide ratio substantially equal to 1:2.

* * * * *